May 3, 1938.   L. LEE   2,115,958

POWER TRANSMISSION DEVICE

Filed June 19, 1936

Inventor
LEIF LEE

By Francis J. Klempay.

Attorney

Patented May 3, 1938

2,115,958

UNITED STATES PATENT OFFICE 2,115,958

POWER TRANSMISSION DEVICE

Leif Lee, Youngstown, Ohio

Application June 19, 1936, Serial No. 86,117

9 Claims. (Cl. 64—30)

This invention relates to a power transmission device and more particularly to a power transmission device which will yield or slip when the applied load exceeds a predetermined maximum. The present invention is an improvement on the device disclosed and claimed in U. S. Patent #1,443,026.

In the structure of the above mentioned patent and in other similar devices within my knowledge, levers have been employed to transmit force from the springs to the rollers engaging the cam surfaces, causing excessive wear at the fulcrums and necessitating frequent repair and adjustment.

Accordingly it is an object of this invention to provide a slip clutch in which the springs exert a force directly in line with the axes of the rollers engaging the cam surfaces and in which the force is not transmitted through levers.

Another object of this invention is to provide a slip clutch of rugged and compact design to withstand severe service with a minimum of repair and adjustment.

Further objects and advantages will become apparent from a consideration of the drawing and the accompanying specification. Changes in the specific form of my invention, as herein disclosed, may be made within the scope of what is claimed without departing from the spirit of the invention.

Figure 1:
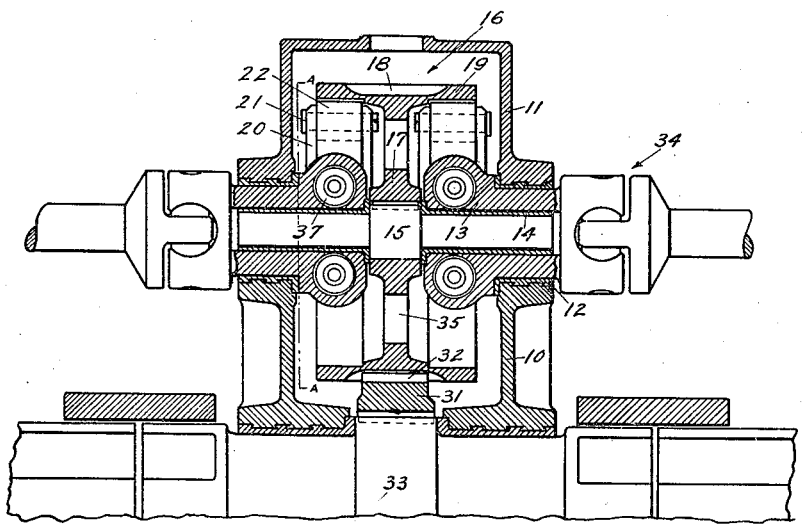
Figure 1 is a sectional view of the assembled device.

Referring more particularly to the drawing there is illustrated by Figure 1 an assembly which is useful in driving top rolls of rolling mills by means of a spindle 33 coupled with the lower driven rolls of the mills. This assembly is taken as an example of the applicability of the invention and is not to be construed as limiting the same.

The slip clutch is housed within an oil-filled casing having an intermediate section 10 (the lower section not shown) and an upper cap portion 11. Longitudinally extending openings in the housing are lined with bearings 12 in which are journaled members 13. The members 13 have enlarged inner ends with two diametrically spaced parallel bores therethrough in which are positioned the compression springs 37. The middle portions of members 13 are reduced in diameter to fit within the bearings 12 while the outer ends thereof form part of universal couplings, generally indicated at 34.

Members 13 are provided with bores extending from their inner ends in which are placed bearing sleeves 14 within which are journaled the ends of a forged shaft 15. Keyed to the enlarged middle portion of shaft 15 is the combined gear and cam member indicated generally by 16. The member 16 consists of a hub portion 17, a spider 35 and a cylindrically shaped peripheral portion having oppositely extending flanges 19. On the central portion of the peripheral surface there are machined gear teeth 18 which extend about the periphery of member 16. The gear teeth 18 mesh with teeth 32 of a ring gear 31 pressed on and keyed to a portion of the spindle 33.

Figure 2:
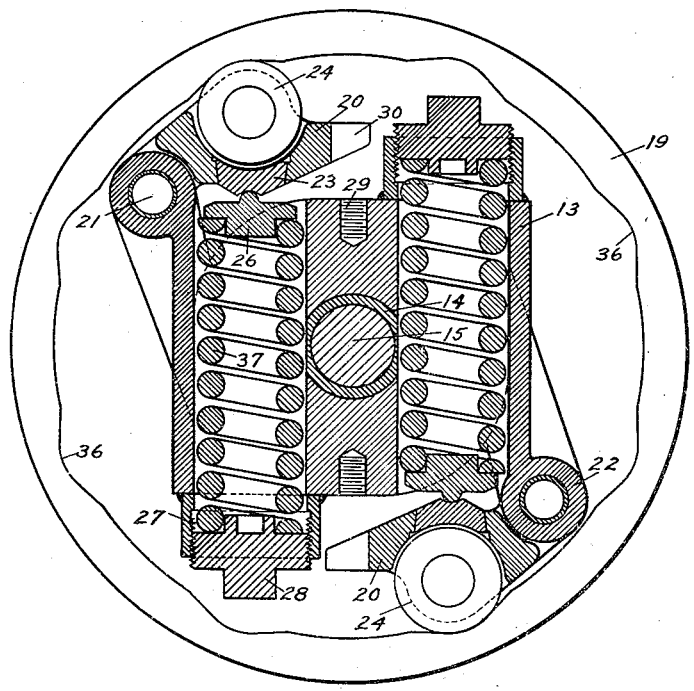
Figure 2 is a partial sectional view on the line A—A of Figure 1.

Referring to Figure 2, the member 13 is provided with a pair of diametrically opposed lugs 22 to which are pivotally connected by pins 21 or otherwise the roller carriers 20. Members 20 are slotted at their ends to receive lugs 22 and are provided with recesses at their centers to accommodate rollers 24 which are rotatably supported on suitable bushed pins secured in the side portions of members 20. Insert 23 of hard tool steel is placed in member 20 and is engaged by the spring pressed wearing block 26 which is also of tool steel to minimize wear. The opposite end of coil spring 37 is engaged by the adjusting plug 28 which is threaded into an internally threaded sleeve 27 fastened to member 13 preferably by welding.

The inner surface of flange 19 is provided with a series of diametrically opposed grooves 36 in which rollers 24 engage to impart rotation to member 13 and coupling 34 upon rotation of the flange 19. Rollers 24 engage the grooves with a variable force varied by adjustment of the plug 28. A heavy load on the coupling 34 will cause rollers 24 to ride out of grooves 36 resulting in slippage between members 13 and 16. The slipping will continue until the load is decreased sufficiently to permit continuous reengagement between the rollers and the grooves when member 13 will again be driven by the gear 16. Increasing the expansive force of the spring by screwing in plug 28 will proportionately increase the transmitted torque before slippage occurs.

Tapped holes 29 are provided on opposite faces of member 13 into which cap screws (not shown) passing through slots 30 of members 20 may be threaded to compress springs 19 and free rollers 24 to aid in assembling the device. These bolts are removed after the device is assembled.

It should be noted that the axes of the coil springs 37 pass substantially through the axes of rotation of the cam engaging rollers 24. This eliminates the transmission of the large force required through any levers and fulcrums. Consequently the device is simpler and more rugged and does not require frequent adjustments or replacements.

The present invention is adaptable for use in any construction requiring a drive which will slip when a predetermined torque is applied.

I claim:

1. A power transmission device comprising a driving member having a hub portion and a rim portion with an extending peripheral flange on each side thereof, a driven member on each side of said hub portion, rollers carried by said driven members and adapted to engage irregular surfaces on said flanges and means carried by driven members to impart an outward force to said rollers.

2. A power transmission device comprising a driving member having irregular surfaces on both sides thereof, a driven member on each side of the driving member, means carried by said driven members and adapted to engage the irregular surfaces of the driving member and means carried by said driven members to force said first mentioned means into engagement with said surfaces.

3. A power transmission device comprising a housing having aligned openings in opposite walls thereof, a driven member journaled within each of said openings, a longitudinally extending bore in each of said driven members, a shaft having its ends journaled within the bores, a driving wheel positioned on the center portion of said shaft, means interconnecting said driving wheel and each of the driven members to impart rotational movement to the driven members but allowing slippage between said driving wheel and either of said driven members when a predetermined load is applied to the driven members.

4. A power transmission device comprising spaced axially aligned rotatable driven members journaled in spaced axially aligned bearings, a driving wheel positioned between said members and adapted to impart rotational movement to said driven members but allowing slippage between said driving wheel and either of said driven members when a predetermined load is applied to the driven members.

5. A power transmission device comprising spaced axially aligned rotatable driven members journaled in spaced axially aligned bearings, longitudinally extending bores in each of said members, a shaft having its ends rotatably supported in said bores, a driving wheel on the center portion of said shaft and positioned between said members and means to flexibly connect said members with said driving wheel.

6. In a power transmission device, a driving member comprising a hub portion, a cylindrically shaped rim portion, means connecting said hub portion and rim portion, driving means on the periphery of said cylindrically shaped portion, the ends of the last named portion constituting flanges and indentations on the inner surface of said flanges.

7. A power transmission device comprising a rotary member having a laterally extending peripheral flange, the inner surface of said flange being provided with a plurality of cam surfaces, a driven member having a portion within said flange provided with a plurality of spaced bores extending therethrough, lugs adjacent to ends of said bores, said lugs being diametrically opposed with respect to the axis of rotation of said members, roller carriers hinged to said lugs and extending across the adjacent ends of said bores, a roller carried by each of said carriers and adapted to engage said cam surfaces, helical springs within the bores exerting outward forces on said carriers, the axis of each spring passing substantially through the axis of rotation of the adjacent roller.

8. A power transmission device comprising a rotary member having a laterally extending peripheral flange, the inner surface of said flange being provided with a plurality of cam surfaces, a driven member having a portion within said flange provided with a plurality of spaced bores extending therethrough, lugs adjacent to ends of said bores, said lugs being diametrically opposed with respect to the axis of rotation of said members, roller carriers hinged to said lugs and extending across the adjacent ends of said bores, a roller carried by each of said carriers and adapted to engage said cam surfaces, helical springs within the bores exerting outward forces on said carriers, the axis of each spring passing substantially through the axis of rotation of the adjacent roller, and means in said bores adjacent their ends opposite said carriers to vary the expansive force of said springs.

9. A power transmission device comprising a rotary member having a laterally extending peripheral flange, the inner surface of said flange being provided with a plurality of cam surfaces, a driven member having a portion within said flange provided with a plurality of spaced bores extending therethrough, lugs adjacent to ends of said bores, said lugs being diametrically opposed with respect to the axis of rotation of said members, roller carriers hinged to said lugs and extending across the adjacent ends of said bores, a roller carried by each of said carriers and adapted to engage said cam surfaces, a hardened steel bearing surface on each of said carriers aligned with said bores, wearing blocks in said bores engaging said bearing surfaces, helical springs within the bores exerting outward forces on said blocks, the axis of each spring passing substantially through the axis of rotation of the adjacent roller.

LEIF LEE.